US011076585B2

(12) United States Patent
Akiba et al.

(10) Patent No.: US 11,076,585 B2
(45) Date of Patent: Aug. 3, 2021

(54) FISHING LINE GUIDE HAVING HIGH-HARDNESS SURFACE LAYER AND FISHING ROD PROVIDED WITH SAID FISHING LINE GUIDE

(71) Applicant: GLOBERIDE, Inc., Tokyo (JP)

(72) Inventors: Masaru Akiba, Tokyo (JP); Masayuki Watanabe, Tokyo (JP); Yasuhiro Tsukamoto, Tokyo (JP)

(73) Assignee: GLOBERIDE, Inc., Tokyo (JP)

( * ) Notice: Subject to any disclaimer, the term of this patent is extended or adjusted under 35 U.S.C. 154(b) by 495 days.

(21) Appl. No.: 16/073,164

(22) PCT Filed: Oct. 6, 2016

(86) PCT No.: PCT/JP2016/079809
§ 371 (c)(1),
(2) Date: Jul. 26, 2018

(87) PCT Pub. No.: WO2017/130470
PCT Pub. Date: Aug. 3, 2017

(65) Prior Publication Data
US 2019/0029240 A1    Jan. 31, 2019

(30) Foreign Application Priority Data
Jan. 27, 2016 (JP) .............................. JP2016-013763

(51) Int. Cl.
*A01K 87/04*    (2006.01)
(52) U.S. Cl.
CPC .................... *A01K 87/04* (2013.01)
(58) Field of Classification Search
CPC ................................................... A01K 87/04
(Continued)

(56) References Cited

U.S. PATENT DOCUMENTS 3,184,331 A * 5/1965 Carter ..................... C23C 10/22
427/398.3
3,402,500 A * 9/1968 Nelson ................... A01K 87/04
43/24
(Continued)

FOREIGN PATENT DOCUMENTS

AU    199894095 A1    6/1999
JP    02-190471 A     7/1990
(Continued)

OTHER PUBLICATIONS

The First Office Action dated Apr. 26, 2020, of counterpart Chinese Application No. 201680072862.2, along with an English translation.
(Continued)

*Primary Examiner* — Christopher P Ellis
(74) *Attorney, Agent, or Firm* — DLA Piper LLP (US)

(57) ABSTRACT

One object is to provide a fishing line guide including a high-hardness guide ring and a fishing rod provided with said fishing line guide. A fishing line guide according to one embodiment of the present invention includes a guide body with a through hole formed therein and a guide ring fitted into the through hole of the guide body. In one aspect, the guide ring includes a base material layer and a surface layer formed on a surface of the base material layer. In one aspect of the present invention, the base material layer is formed of an alloy having an Fe content of 3 wt % or less or 2 wt % or less. In one aspect of the present invention, the surface layer is formed of chromium carbide, titanium carbide, or vanadium carbide.

9 Claims, 7 Drawing Sheets

(58) Field of Classification Search
USPC .................................................... 43/24
See application file for complete search history.

(56) References Cited

U.S. PATENT DOCUMENTS

| | | | | |
|---|---|---|---|---|
| 3,959,557 | A * | 5/1976 | Berry | B65H 57/08 |
| | | | | 428/368 |
| 5,589,011 | A * | 12/1996 | Gonsalves | B22F 1/0018 |
| | | | | 148/325 |
| 6,067,743 | A | 5/2000 | Ohmura | |
| 6,154,998 | A | 12/2000 | Hashimoto et al. | |
| 6,464,159 | B2 * | 10/2002 | Nakagawa | A01K 89/0192 |
| | | | | 242/310 |
| 2002/0037120 | A1 * | 3/2002 | Tanaka | C23C 22/24 |
| | | | | 384/492 |
| 2004/0055205 | A1 * | 3/2004 | Pack | A01K 85/00 |
| | | | | 43/42.53 |
| 2006/0160636 | A1 * | 7/2006 | Palumbo | A63B 59/70 |
| | | | | 473/316 |
| 2008/0216383 | A1 * | 9/2008 | Pierick | A01K 89/00 |
| | | | | 43/18.1 R |
| 2010/0098464 | A1 | 4/2010 | Suzuki et al. | |
| 2011/0104404 | A1 * | 5/2011 | Hamamura | C04B 35/58014 |
| | | | | 428/31 |
| 2011/0239519 | A1 * | 10/2011 | Akiba | A01K 87/04 |
| | | | | 43/24 |
| 2015/0089857 | A1 | 4/2015 | Akiba | |
| 2015/0201595 | A1 * | 7/2015 | Takenouchi | A01K 87/04 |
| | | | | 43/24 |
| 2016/0286772 | A1 * | 10/2016 | Gnann | A01K 87/04 |
| 2018/0202233 | A1 * | 7/2018 | Cleboski | E21B 10/43 |
| 2018/0343841 | A1 * | 12/2018 | Mikaki | A01K 87/04 |
| 2019/0008129 | A1 * | 1/2019 | Akiba | A01K 87/04 |
| 2019/0124900 | A1 * | 5/2019 | Zhang | A01K 87/04 |

FOREIGN PATENT DOCUMENTS

| | | |
|---|---|---|
| JP | 08-311587 A | 11/1996 |
| JP | 10-136839 A | 5/1998 |
| JP | 11-155429 A | 6/1999 |
| JP | 11-227231 A | 8/1999 |
| JP | 2009-074104 A | 4/2009 |
| JP | 2010-117697 A | 5/2010 |
| JP | 2010-154783 A1 | 7/2010 |
| JP | 2012-075375 A | 4/2012 |
| JP | 2012-110287 A | 6/2012 |
| JP | 2015-065911 A | 4/2015 |
| WO | 2010/137652 A1 | 12/2010 |
| WO | 2013/073597 A1 | 5/2013 |
| WO | 2014/119522 A1 | 1/2017 |

OTHER PUBLICATIONS

Notice of Reasons for Refusal dated Jul. 7, 2020, of counterpart Japanese Application No. 2017-563678, along with an English translation.
The Extended Search Report dated Oct. 2, 2019, of counterpart European Application No. 16888055.7.
International Preliminary Report on Patentability dated Apr. 27, 2018 issued in corresponding International Application No. PCT/JP2016/079809 with English translation.
International Search Report PCT/JP2016/079809 dated Nov. 1, 2016 with English translation.
Second Office Action dated Dec. 8, 2020, of counterpart Chinese Application No. 201680072862.2, along with an English translation.

* cited by examiner

FISHING LINE GUIDE HAVING HIGH-HARDNESS SURFACE LAYER AND FISHING ROD PROVIDED WITH SAID FISHING LINE GUIDE

CROSS-REFERENCE TO RELATED APPLICATIONS

This application is the U.S. National Phase of PCT/JP2016/079809, filed, Oct. 6, 2016, which claims the benefit of priority from Japanese Patent Application Serial No. 2016-013763, filed Jan. 27, 2016. The contents of each are hereby incorporated by reference in their entirety. The present invention relates to a fishing line guide having a high-hardness surface layer and a fishing rod provided with said fishing line guide.

TECHNICAL FIELD

Background

A conventional fishing rod is provided with a plurality of fishing line guides provided on an outer peripheral surface of a rod element thereof in order to guide a fishing line along the rod element, the fishing line being released from a reel or wound on the reel. A conventional fishing line guide typically includes a flat plate-shaped frame and a guide ring fitted into a mounting hole of said frame.

The fishing line is inserted through the guide ring. Accordingly, at the time of casting the fishing rod or winding the fishing line, an inner peripheral surface of the guide ring makes contact with the fishing line. In order to prevent the guide ring from being easily worn due to contact with the fishing line, the guide ring is manufactured from a hard member such as, for example, ceramics. Such a guide ring made of ceramics is disclosed in, for example, Japanese Patent Application Publication No. Hei 10-136839 (Patent Literature 1), Japanese Patent Application Publication No. Hei 11-155429 (Patent Literature 2), and International Publication WO 2014/119522 (Patent Literature 3).

The guide ring made of ceramics, however, has a disadvantage of being vulnerable to an impact. Particularly, the guide ring made of ceramics is problematic in that the guide ring might break when subjected to a large impact. As a solution to this problem, a guide ring made of metal has been proposed. Such a guide ring made of metal is disclosed in, for example, Japanese Patent Application Publication 2012-110287 (Patent Literature 4) and Japanese Patent Application Publication 2015-65911 (Patent Literature 5).

RELEVANT REFERENCES

List of Relevant Patent Literature

Patent Literature 1: Japanese Patent Application Publication No. Hei 10-136839
Patent Literature 2: Japanese Patent Application Publication No. Hei 11-155429
Patent Literature 3: International Publication No. WO 2014/119522
Patent Literature 4: Japanese Patent Application Publication No. 2012-110287
Patent Literature 5: Japanese Patent Application Publication No. 2015-65911

SUMMARY

The conventional guide ring made of metal, however, is problematic in that the guide ring is low in hardness and thus is likely to be worn due to friction against a fishing line. To be more specific, as the conventional guide ring made of metal, there is known a guide ring formed from titanium, aluminum having a surface subjected to an alumite process, or stainless steel having a surface plated with hard chromium. Titanium has a Vickers hardness of about 150 Hv to 250 Hv, alumite has a Vickers hardness of about 350 Hv to 450 Hv, and the hard chromium-plated surface of stainless steel has a Vickers hardness of about 1,000 Hv to 1,100 Hv. Furthermore, it is known that the guide ring made of stainless steel is prone to rust.

One object of the present invention is to provide a fishing line guide including a high-hardness guide ring and a fishing rod provided with said fishing line guide. Furthermore, another object of the present invention is to provide a fishing line guide including a guide ring more resistant to rust than the conventional guide ring made of stainless steel and a fishing rod provided with said fishing line guide. The other objects of the present invention will be apparent with reference to the entire description in this specification.

A fishing line guide according to one embodiment of the present invention includes a guide body with a through hole formed therein and a guide ring fitted into the through hole of the guide body. In one aspect, the guide ring includes a base material layer and a surface layer formed on a surface of the base material layer. In one aspect of the present invention, the base material layer is formed of an alloy having an Fe content of 3 wt % or less. In another aspect of the present invention, the base material layer is formed of an alloy having an Fe content of 2 wt % or less. In one aspect of the present invention, the surface layer is formed of chromium carbide, titanium carbide, or vanadium carbide. When formed of chromium carbide, the surface layer is formed on the surface of the base material layer by, for example, first subjecting said base material layer to a carburizing process so that a carburization layer is formed thereon and then subjecting the carburization layer to a process of diffusing and impregnating chromium into the carburization layer (a chromizing process). When formed of titanium carbide, the surface layer is formed on the surface of the base material layer by, for example, first subjecting said base material layer to the carburizing process so that a carburization layer is formed thereon and then subjecting the carburization layer to a process of diffusing and impregnating titanium into the carburization layer (a titanizing process). When formed of vanadium carbide, the surface layer is formed on the surface of the base material layer by, for example, first subjecting said base material layer to the carburizing process so that a carburization layer is formed thereon and then subjecting the carburization layer to a process of diffusing and impregnating vanadium into the carburization layer (a VC process).

In the above-described aspect, in a case where the surface layer formed of chromium carbide is formed on a surface of the guide ring, the surface of said guide ring has a hardness as high as a Vickers hardness of about 1,300 Hv to 1,800 Hv. Furthermore, in a case where the surface layer formed of titanium carbide is formed on the surface of the guide ring, the surface of said guide ring has a hardness as high as a Vickers hardness of about 2,000 Hv to 3,000 Hv. Furthermore, in a case where the surface layer formed of vanadium carbide is formed on the surface of the guide ring, the surface of said guide ring has a hardness as high as a Vickers hardness of about 2,000 Hv to 3,000 Hv. Accordingly, it is unlikely that this guide ring suffers from attrition due to contact with a fishing line. Furthermore, in these aspects, the base material layer of the guide ring is formed of an alloy containing 3 wt % or less or 2 wt % or less of Fe, and thus the guide ring is extremely resistant to rust.

A guide ring according to one aspect of the present invention is curved into a convex form toward an inner peripheral side as viewed in a cross section cut along a plane including an axial direction thereof.

In the conventional fishing line guide, in order to stably retain the guide ring in the guide body, the guide ring is configured so that a part thereof opposed to the through hole of the guide body extends in a direction parallel to an axial direction of the through hole of the guide body. For example, in Japanese Patent Application Publication No. 2012-110287, a boss portion 6C extends parallel to an inner peripheral surface of a mounting hole 7F of a guide body 7. However, with an increase in contact area between an outer peripheral surface of the guide ring and an inner peripheral surface of the through hole of the guide body, when the guide ring is fitted into the guide body, a large stress is exerted on said guide ring. Such a stress might even lead to breakage of the guide ring. According to the above-described aspect of the present invention, since the guide ring is curved into a convex form toward the inner peripheral side, a contact area between the inner peripheral surface of the guide body and the guide ring can be decreased. Thus, it is possible to reduce a stress exerted on the guide ring when the guide ring is fitted into the guide body.

In one aspect of the present invention, the guide ring is curved so as to come in contact at a front end surface thereof with the inner peripheral surface of the through hole of the guide body.

According to said aspect, since the guide ring comes in contact at the front end surface thereof with the guide body, a contact area between the guide ring and the guide body can be decreased.

In one aspect of the present invention, the guide ring is curved so that a rear edge portion thereof comes in contact with a rear surface of the guide body.

According to said aspect, the guide ring can be supported not only by the inner peripheral surface of the through hole of the guide body but also by the rear surface of said guide body. Thus, the guide ring can be more stably supported.

In one aspect of the present invention, the guide ring is curved so that a gap is formed between an outer peripheral surface of said guide ring and the guide body, and an adhesive is applied in said gap.

According to said aspect, it is possible to reduce a stress exerted on the guide ring when the guide ring is fitted into the guide body and also, after the guide ring is fitted into the guide body, to stably retain the guide ring by use of an adhesive.

A fishing rod according to one aspect of the present invention is provided with at least one fishing line guide according to any of the above-mentioned aspects.

Advantages

According to embodiments of the present invention, there is provided a fishing line guide having a high-hardness guide ring and a fishing rod provided with said fishing line guide.

DESCRIPTION OF THE EMBODIMENTS

Figure 1:
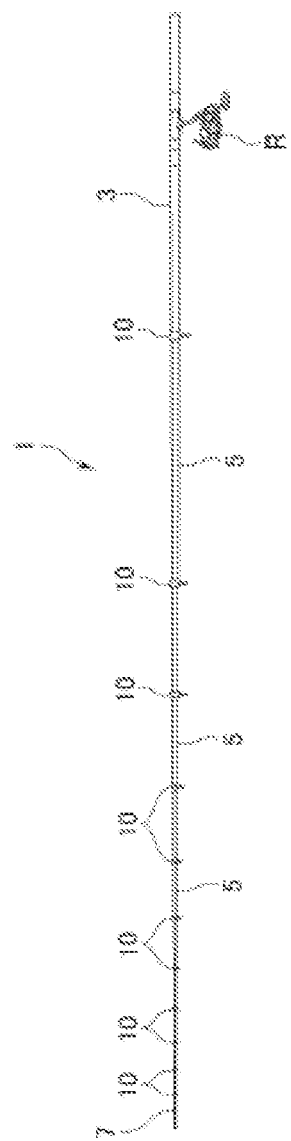
FIG. 1 is a side view schematically showing a configuration of a fishing rod according to one embodiment of the present invention.

By appropriately referring to the appended drawings, the following describes various embodiments of the present invention. In the drawings, the same constituent components are denoted by the same reference characters. It is to be noted that, for the sake of convenience of description, the drawings are not necessarily depicted to scale.

FIG. 1 is an external view of a fishing rod 1 according to one embodiment of the invention, the fishing rod 1 being provided with a fishing line guide 10 according to one embodiment of the present invention. In the embodiment shown, the fishing rod 1 is a telescopic type fishing rod having a butt rod section 3, a plurality of (in an example shown in FIG. 1, three) intermediate rod sections 5, and a tip rod section 7. When the fishing rod 1 is not in use, the intermediate rod sections 5 and the tip rod section 7 are housed in the hollow butt rod section 3.

The butt rod section 3, the intermediate rod sections 5, and the tip rod section 7 each can be formed by using, for example, a prepreg sheet made of carbon fibers impregnated with a synthetic resin. Furthermore, the butt rod section 3, the intermediate rod sections 5, and the tip rod section 7 each have a tapered shape tapered in a tip direction. On outer peripheral surfaces of the intermediate rod sections 5 and the tip rod section 7, there are provided a plurality of fishing line guides 10 that guide a fishing line released from a reel R to a tip of the fishing rod 1.

Figure 2:
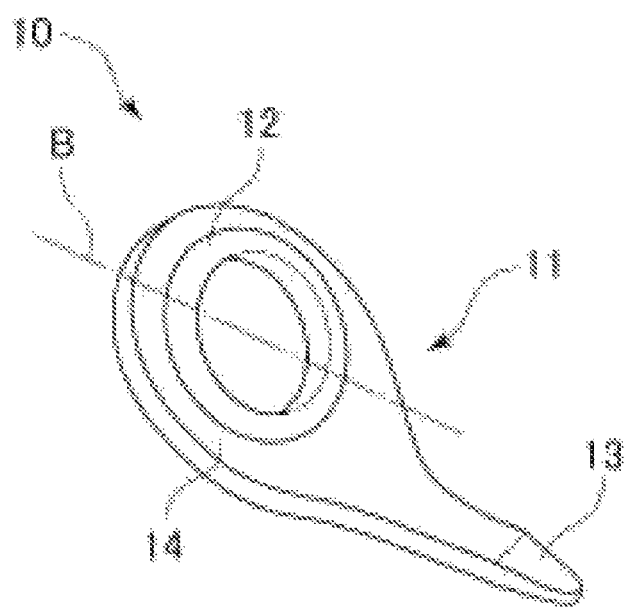
FIG. 2 is a perspective view of a fishing line guide according to one embodiment of the present invention.
Figure 3:
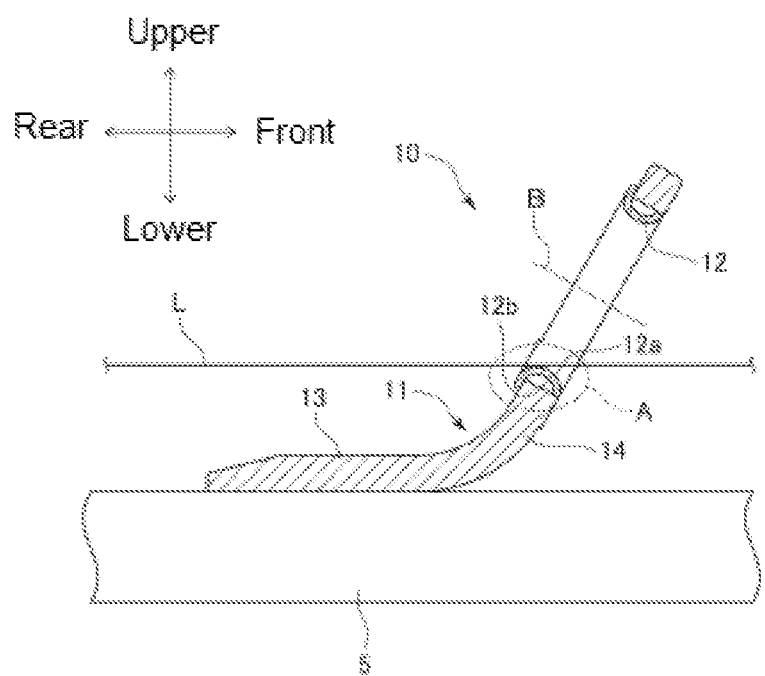
FIG. 3 is a longitudinal sectional view of the fishing line guide according to one embodiment of the present invention.
Figure 4:
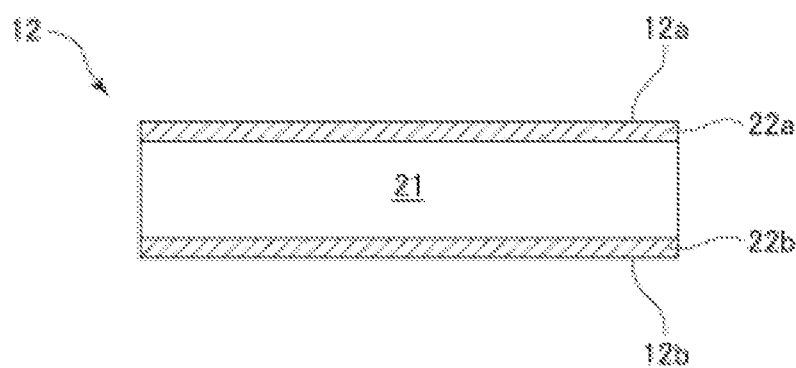
FIG. 4 is a view schematically showing a cross section of a guide ring of the fishing line guide according to one embodiment of the present invention.
Figure 5:
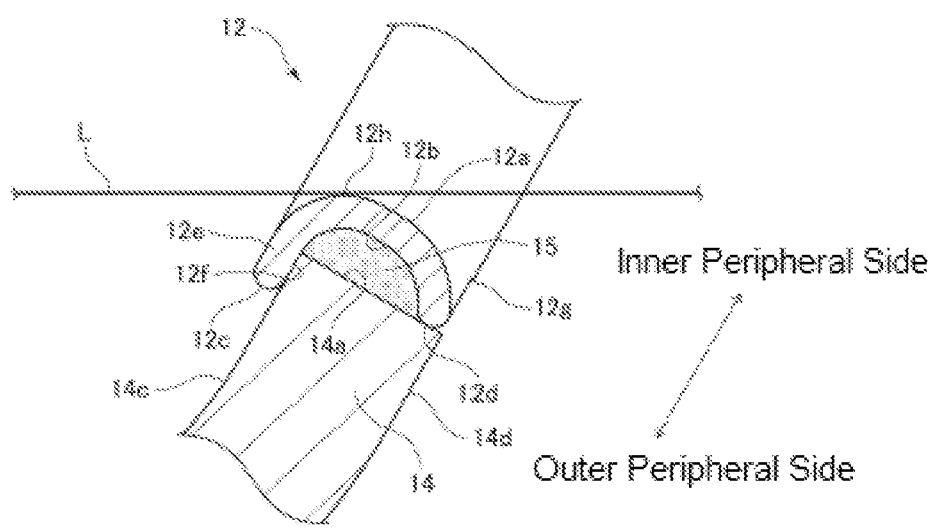
FIG. 5 is an enlarged longitudinal sectional view showing part of the fishing line guide shown in FIG. 3.

With reference to FIG. 2 to FIG. 5, a description is given of a fishing line guide according to one embodiment of the present invention. FIG. 2 is a front view of a fishing line guide 10 in one embodiment, and FIG. 3 is a longitudinal sectional view of the fishing line guide 10. FIG. 4 is a view schematically showing a cross section of a guide ring 12, and FIG. 5 is an enlarged longitudinal sectional view of a region in the vicinity of a lower end of the fishing line guide 10 shown in FIG. 3 (a region enclosed by a dotted line A in FIG. 3).

As shown in the figures, the fishing line guide 10 includes a guide body 11 and an annular guide ring 12 mounted to the guide body 11. The guide body 11 includes a foot portion 13 mounted to any of a rod element 3, a rod element 5, and a rod element 7 and a plate-shaped ring retaining portion 14 connected to the foot portion 13. For the sake of convenience of description, the following description is directed to an exemplary case where the fishing line guide 10 is mounted to the rod element 5.

In one embodiment of the present invention, the foot portion 13 is an elongated plate-shaped or tongue-shaped member extending along an outer peripheral surface of the rod element 5. The foot portion 13 is wound on the rod element 5 by use of, for example, a winding thread made of nylon fibers. While FIG. 2 illustratively shows a fishing line guide of a single-foot type having one foot portion used to mount the fishing line guide to a rod element, a guide ring to which the present invention is applicable is not limited to this single-foot type. For example, the present invention is also applicable to a guide ring of a double-foot type. A fishing line guide of the double foot type has a pair of foot portions extending from a ring retaining portion to a front side and a rear side, respectively, and this pair of foot portions is used to secure the fishing line guide to a rod element. Furthermore, the present invention is also applicable to both a stationary fishing line guide and a movable fishing line guide (which may be referred to as a free guide).

In one embodiment of the present invention, the ring retaining portion 14 extends from an upper end of the foot portion 13. The ring retaining portion 14 is inclined upward from the rear toward the front of the rod element 5. That is, with the guide ring 10 mounted to the rod element 5, the ring retaining portion 14 assumes a posture fallen toward the front of the rod element 5. As shown in the figures, the ring retaining portion 14 has a through hole formed therein, the through hole piercing through the ring retaining portion 14 generally in a front-rear direction of the rod element 5. This through hole is defined by an inner peripheral surface 14a of the ring retaining portion 14. The guide ring 12 is fitted into this through hole. While the ring retaining portion 14 is a generally flat plate-shaped member, a connection portion thereof with the foot portion 13 is mildly curved as shown in FIG. 3. That is, the ring retaining portion 14 includes a flat portion that is generally flat and has the through hole formed therein, the guide ring 10 being fitted into the through hole, and a curved portion that is mildly curved and is connected to the foot portion 13.

The foot portion 13 and the ring retaining portion 14 can be integrally manufactured from a prepreg sheet. In manufacturing the foot portion 13 and the ring retaining portion 14, first, a plurality of prepreg sheets are laminated to each other by pressing and then subjected to burning and hardening, and thus a prepreg molded article is formed Next, a frame having a shape corresponding to the foot portion 13 and the ring retaining portion 14 is cut out of this prepreg molded article. In this manner, the frame is obtained as an integrated body of the foot portion 13 and the ring retaining portion 14. Detailed process steps for manufacturing a fishing line guide from a prepreg sheet are described in, for example, International Application PCT/JP2012/079595 filed by the applicant of the present invention. The fishing line guide 10 can be manufactured by using any known technique other than the above. For example, the fishing line guide 10 can be formed by injection molding using metal or a synthetic resin.

The annular guide ring 12 is fitted into the through hole of the ring retaining portion 14. As best shown in FIG. 3, the guide ring 12 has a ring inner peripheral surface 12a extending annularly in a circumferential direction of the guide ring 12 and a ring outer peripheral surface 12b extending parallel to the ring inner peripheral surface 12a.

With reference to FIG. 4, a further description is given of the guide ring 12. As shown in the figure, the guide ring 12 has a base material layer 21, a surface layer 22a, and a surface layer 22b. The surface later 22a is formed on a surface of the base material layer 21 near the inner peripheral surface 12a, and the surface layer 22b is formed on a surface of the base material layer 21 near the outer peripheral surface 12b. In this specification of the present invention, the surface layer 22a and the surface layer 22b may be referred to collectively as a surface layer 22. The surface layer 22b arranged near the outer peripheral surface 12b can be omitted.

The base material layer 21 in one embodiment of the present invention is made of, for example, a Co—Ni-base alloy. The base material layer 21 is formed of, for example, an alloy containing Co, Ni, Cr, Mo, Fe, and inevitable impurities. The base material layer 21 may contain Mn, Ti, and/or Nb. The base material layer in one embodiment of the present invention is constituted of, for example, 30 wt % to 40 wt % of Co, 27 wt % to 37 wt % of Ni, 12 wt % to 25 wt % of Cr, 5 wt % to 10 wt % of Mo, 3 wt % or less of Fe, and a balance of inevitable impurities. Furthermore, in one embodiment of the present invention, as a material of this base material layer, for example, SPRON 510 manufactured by Seiko Instruments Inc. can be used (SPRON is a registered trademark). In one embodiment of the present invention, the base material layer 21 has an Fe content of 3 wt % or less. In another embodiment of the present invention, the base material layer 21 has an Fe content of 2 wt % or less.

The surface layer 22 is formed of, for example, chromium carbide (CrC), titanium carbide (TiC), or vanadium carbide (VC). When formed of chromium carbide, the surface layer 22 is formed on the surface of the base material layer 21 by, for example, subjecting the base material layer 21 to a carburizing process in accordance with an ordinary method so that a carburization layer is formed thereon and next subjecting the base material layer with the carburization layer formed thereon to a chromium impregnation-diffusion process (a chromizing process). When formed of titanium carbide, the surface layer 22 is formed on the surface of the base material layer 21 by, for example, subjecting the base material layer 21 to the carburizing process in accordance with the ordinary method so that a carburization layer is formed thereon and next subjecting the base material layer with the carburization layer formed thereon to a titanium impregnation-diffusion process (a titanizing process). When formed of vanadium carbide, the surface layer 22 is formed on the surface of the base material layer 21 by, for example, subjecting the base material layer 21 to the carburizing process in accordance with the ordinary method so that a carburization layer is formed thereon and next subjecting the base material layer with the carburization layer formed thereon to a vanadium impregnation-diffusion process (a VC process). Examples of the carburizing process and the chromizing process are disclosed in, for example, Japanese Patent Application Publication No. 2014-238143. In a case where the surface layer 22 is formed of chromium carbide, a surface of the guide ring 12 has a hardness as high as a Vickers hardness of about 1,300 Hv to 1,800 Hv (preferably, a Vickers hardness of about 1,600 Hv to 1,800 HV). In a case where the surface layer 22 is formed of titanium carbide, the surface of the guide ring 12 has a hardness as high as a Vickers hardness of about 2,000 Hv to 3,000 Hv. In a case where the surface layer 22 is formed of vanadium carbide, the surface of the guide ring 12 has a hardness as high as a Vickers hardness of about 2,000 Hv to 3,000 Hv. Accordingly, it is unlikely that the guide ring 12 suffers from attrition due to contact with a fishing line L. Furthermore, the base material layer 21 is formed of an alloy having an Fe content of 3 wt % or less, and thus the guide ring 12 is extremely resistant to rust.

With reference to FIG. 5, a further description is given of the shape of the guide ring 12 and joining between the guide ring 12 and the ring retaining portion 14. As shown in the figure, the guide ring 12 is formed so as to be curved into a convex form toward an inner peripheral side (toward the inner peripheral surface 12a) as viewed in a cross section cut along a plane including an axial direction B thereof. In one embodiment of the present invention, the guide ring 12 is formed and disposed so that a rear end portion 12*e* thereof extends along a rear surface 14*c* of the ring retaining portion 14. In one embodiment, the guide ring 12 is formed and disposed so that a front surface 12*f* of the rear end portion 12*e* thereof comes in contact with the rear surface 14*c* of the ring retaining portion 14. Thus, the guide ring 12 is more stably retained to the ring retaining portion 14.

In one embodiment, the guide ring 12 is formed and disposed so that a rear end surface 12*c* thereof is arranged on a rear side relative to the inner peripheral surface 14*a* of the ring retaining portion 14, while a front end surface 12*d* thereof comes in contact with the inner peripheral surface 14*a* of the ring retaining portion 14. Thus, when the guide ring 12 is fitted into the through hole of the ring retaining portion 14, the guide ring 12 makes contact at the end surface 12*d* thereof with the inner peripheral surface 14*a* of the ring retaining portion 14, so that a contact area between the guide ring 12 and the through hole of the ring retaining portion 14 is decreased. Accordingly, when the guide ring 12 is fitted into the through hole of the ring retaining portion 14, a large stress is prevented from being exerted on the guide ring 12.

In one embodiment, the guide ring 12 is formed and disposed so that a front end portion 12*g* thereof is flush with a front surface 14*d* of the ring retaining portion 14. In another embodiment, the guide ring 12 is formed and disposed so that the front end portion 12*g* thereof is arranged at a position somewhat retracted to a rear side in the axial direction B relative to said front surface 14*d*. Thus, it is unlikely that the fishing line L gets caught on the guide ring 12 at the front of the fishing line guide 10.

In one embodiment of the present invention, as shown in the figure, the guide ring 12 is formed and disposed so that a gap is formed between the outer peripheral surface 12*b* thereof and the inner peripheral surface 14*a* of the ring retaining portion 14. Any type of adhesive 15 may be applied in this gap. Thus, the guide ring 12 is more stably retained to the ring retaining portion 14.

In one embodiment of the present invention, when the fishing line L is under a tension (for example, at the time of winding the fishing line L), the guide ring 12 makes contact at a top portion 12*h* thereof with the fishing line L, the top portion 12*h* being on an uppermost side of the inner peripheral surface 12*a* of the guide ring 12. The guide ring 12 is formed and disposed so that a tangential direction of the top portion 12 is substantially the same as an extending direction of the fishing line L (substantially the same as a longitudinal direction of the rod element 5). Thus, at the time of winding the fishing line L, a friction force exerted on the fishing line L can be reduced.

Next, a description is given of a method for processing the guide ring 12 in an exemplary case where the surface layer 22 is formed of chrome carbide. First, a guide ring base material is prepared. As the guide ring base material, the above-mentioned SPRON 510 manufactured by Seiko Instruments Inc. can be used. The guide ring base material is processed into a shape of a thin plate having a thickness of 0.1 cm to 0.3 cm. Next, the guide ring base material in the thin plate shape is heated to 900° C. to 1,000° C. so that the guide ring base material is softened. While being softened by this heating, the guide ring base material is processed, by pressing, from the thin plate shape into a ring shape shown in some of the figures such as FIG. 3.

Next, the guide ring base material thus processed into the ring shape is subjected to a carburizing process in accordance with an ordinary method. For example, in a case of adopting pack carburizing in the carburizing process, the carburizing process is performed by generally following procedures described below. First, a carburizing box packed with a carburizing material primarily composed of charcoal is prepared Next, the guide ring base material is buried in this carburizing box, which then is hermetically sealed Next, the guide ring base material, together with the carburizing box, is heated at, for example, about 900° C. to 1,200° C. for a predetermined time. After being heated, the guide ring base material is cooled and then is taken out. Thus, a carburization layer is formed on a surface of the guide ring base material. In the present invention, in place of the pack carburizing, liquid carburizing, gas carburizing, or vacuum carburizing may be used.

Next, the guide ring base material with the carburization layer formed thereon is subjected to a chromizing process in accordance with an ordinary method. The chromizing process is performed by generally following procedures described below. First, a process box packed with a preparation composed of a chromium powder, an aluminum oxide powder, and an ammonium chloride powder is prepared Next, the guide ring base material with the carburization layer formed thereon is buried in this process box, which then is hermetically sealed. Next, the guide ring base material, together with the process box, is heated at, for example, about 900° C. to 1,200° C. for a predetermined time and then is cooled. Thus, a chromium carbide (CrC) layer having a thickness of about 10 μm to 30 μm is formed on the surface of the guide ring base material. In this manner, there is obtained a guide ring having a surface with the chromium carbide layer formed thereon. The guide ring is subjected to a predetermined cleaning process. Furthermore, said guide ring is polished using a barrel polisher so that the guide ring has predetermined dimensions and a predetermined surface roughness.

Figure 6:
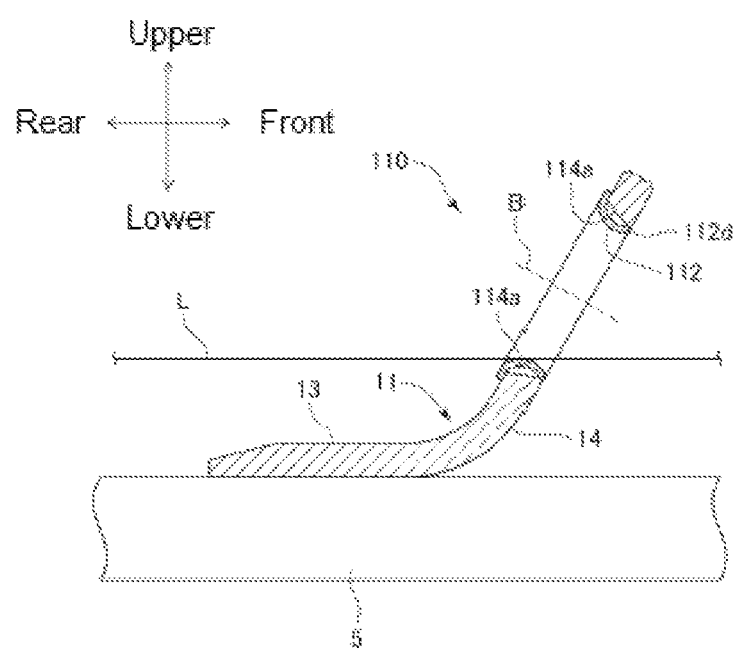
FIG. 6 is a longitudinal sectional view of a fishing line guide according to one embodiment of the present invention.

With reference to FIG. 6, a description is given of a fishing line guide according to another embodiment of the present invention. A fishing line guide 110 according to another embodiment of the present invention shown in FIG. 6 is different from the fishing line guide 10 in terms of the shape of an inner peripheral surface of a ring retaining portion and the shape of a guide ring. As shown in FIG. 6, an inner peripheral surface 114*a* of the fishing line guide 110 is formed so as to be inclined with respect to an axis B. Therefore, a through hole of a ring retaining portion 14, which is defined by the inner peripheral surface 114*a*, has a diameter decreasing from a rear side toward a front side of the axis B. That is, the through hole of the ring retaining portion 14 of the fishing line guide 110 has a diameter increased on the rear side and decreased on the front side. A guide ring 112 is formed and disposed so that a front end surface 112 d thereof comes in contact with the inner peripheral surface 114*a* in the vicinity of a front end thereof. Therefore, according to the embodiment shown in FIG. 6, the guide ring 112 is fitted from the rear side toward the front side into the through hole of the ring retaining portion 14, and thus the guide ring 112 can be smoothly fitted into the through hole of the guide retaining portion 14.

Figure 7:
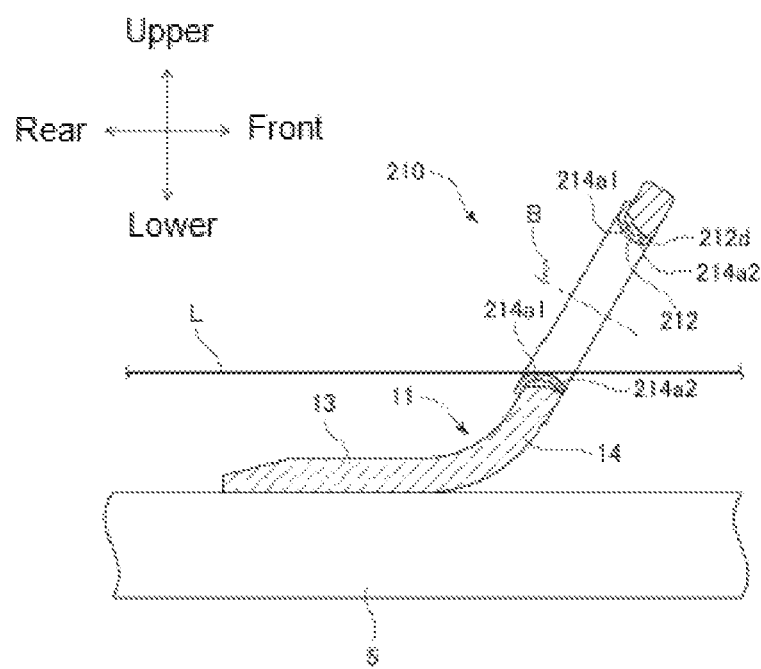
FIG. 7 is a longitudinal sectional view of a fishing line guide according to one embodiment of the present invention.

With reference to FIG. 7, a description is given of a fishing line guide according to still another embodiment of the present invention. A fishing line guide 210 according to still another embodiment of the present invention shown in FIG. 7 is different from the fishing line guide 10 in terms of the shape of an inner peripheral surface of a ring retaining portion and the shape of a guide ring. As shown in FIG. 7, an inner peripheral surface 214*a* of the fishing line guide 210 has an inclined portion 214*a*1 extending so as to be inclined with respect to an axis B and a small diameter portion 214*a*2 extending parallel to the axis B from a front end of said inclined portion 214*a*1. The small diameter portion 214*a*2 has a diameter smaller than that of the inclined portion 214*a*1. A guide ring 212 is formed and disposed so that a front end surface 212*d* thereof comes in contact with the small diameter portion 214*a*2. Therefore, according to the embodiment shown in FIG. 7, the guide ring 212 is fitted from a rear side toward a front side into a through hole of a ring retaining portion 14, and thus the guide ring 212 can be smoothly fitted into the through hole of the guide retaining portion 14. Furthermore, according to the embodiment shown in FIG. 7, the guide ring 212 can be stably retained by the small diameter portion 214*a*2.

The dimensions, materials, and arrangements of the various constituent components described in this specification are not limited to those explicitly described in the embodiments, and the various constituent components can be modified to have any dimensions, materials, and arrangements within the scope of the present invention. Furthermore, constituent components not explicitly described in this specification can also be added to the embodiments described, and some of the constituent components described in the embodiments can also be omitted.

LIST OF REFERENCE NUMBERS 1 fishing rod
3, 5, 7 rod element
10 fishing line guide
11 guide body
12 guide ring
13 foot portion
14 ring retaining portion
21 base material layer
22*a*, 22*b* surface layer
L fish line

What is claimed is:

1. A fishing line guide, comprising:
   a guide body with a through hole formed therein; and
   a guide ring fitted into the through hole of the guide body, wherein the guide ring includes:
      a base material layer; and
      a surface layer formed on a surface of the base material layer,
   the base material layer is formed of an alloy having an Fe content of 3 wt % or less,
   the surface layer is formed of chromium carbide, titanium carbide, or vanadium carbide,
   the guide ring is curved into a convex form toward an inner peripheral side as viewed in a cross section cut along a plane including an axial direction of the guide ring, and
   the guide ring is curved so that a gap is formed between an outer peripheral surface of the guide ring and an inner peripheral surface of the guide body, and the fishing line guide further comprises an adhesive arranged in said gap.

2. The fishing line guide according to claim 1, wherein the base material layer has an Fe content of 2 wt % or less.

3. The fishing line guide according to claim 1, wherein the base material layer is formed of an alloy containing Ni, Co, Cr, Mo, and Fe.

4. The fishing line guide according to claim 1, wherein the guide ring is curved so that a front surface of a rear end portion thereof comes in contact with a rear surface of the guide body.

5. The fishing line guide according to claim 1, wherein the guide ring is curved so as to come in contact at a front end surface thereof with an inner peripheral surface of the through hole of the guide body.

6. The fishing line guide according to claim 1, wherein the surface layer is formed of chromium carbide and has a thickness of 10 μm to 30 μm.

7. The fishing line guide according to claim 1, wherein the surface layer is formed on the surface of the base material layer on an outer peripheral side.

8. The fishing line guide according to claim 1, wherein a front end portion of the guide ring is positioned posterior to a front surface of the guide body in an axial direction of the guide ring.

9. A fishing rod comprising at least one fishing line guide as claimed in claim 1.

* * * * *